United States Patent [19]
Reddy et al.

[11] Patent Number: 4,935,161
[45] Date of Patent: Jun. 19, 1990

[54] PROCESS FOR YTAO$_4$:NB PHOSPHOR PREPARATION USING REDUCED AMOUNT OF FLUX

[75] Inventors: Vaddi B. Reddy, Sayre; Ha Cheung, Towanda, both of Pa.

[73] Assignee: GTE Products Corporation, Stamford, Conn.

[21] Appl. No.: 417,413

[22] Filed: Oct. 5, 1989

[51] Int. Cl.$^5$ .............................................. C09K 11/78
[52] U.S. Cl. ............................................... 252/301.4 R
[58] Field of Search ................................... 252/301.4 R

[56] References Cited

U.S. PATENT DOCUMENTS

| | | | |
|---|---|---|---|
| 3,459,674 | 8/1969 | Emoto et al. | 252/301.4 R |
| 4,024,069 | 5/1977 | Larach | 252/301.4 R |
| 4,225,653 | 9/1980 | Brixner | 428/539 |

FOREIGN PATENT DOCUMENTS

| | | | |
|---|---|---|---|
| 202875 | 11/1986 | European Pat. Off. | 252/301.4 R |
| 49-34311 | 9/1974 | Japan | 252/301.4 R |

OTHER PUBLICATIONS

Article, "On the Structural and Luminescent Properties of the M' LnTaO$_4$ Rare Earth Tantalates", by L. H. Brixner and H.-y Chen (J. Electrochemical Soc., vol. 130, No. 12, pp. 2435-2443).

Primary Examiner—Jack Cooper
Attorney, Agent, or Firm—Robert E. Walter

[57] ABSTRACT

A process is disclosed for preparing M' YTaO$_4$:Nb x-ray phosphor which comprises forming a uniform first mixture of Y$_2$O$_3$, Ta$_2$O$_5$, and Nb$_2$O$_5$ in amounts equal to approximately the stoichiometric amounts to form the phosphor, milling with a flux of lithium chloride, the flux making up about 25% to 33% by weight of the mixture, firing the mixture in a furnace by heating to a temperature of about 1200° C. to 1300° C. at a heating rate of about 1.0° C./minute to 1.5° C./minute and maintaining the temperature for about 10 to 14 hours to react the components and produce a fired material containing luminescent material, cooling the material by turning off the heat and allowing the material to remain in the furnace until the temperature is no higher than about 300° C., washing with deionized water, removing the wash water, drying, and classifying to obtain a −325 mesh particle size. The phosphor exhibits improved brightness over that of phosphors produced by methods using water or organic solvents as the milling fluid and substantially reduces crucible corrosion. Reduced amount of Nb$_2$O$_5$ activator concentration has a beneficial effect on phosphor brightness.

3 Claims, No Drawings

PROCESS FOR YTAO4:NB PHOSPHOR PREPARATION USING REDUCED AMOUNT OF FLUX

CROSS-REFERENCE TO RELATED APPLICATIONS

This application is related to application Ser. No. 362,721, entitled "Process For Preparing A Niobium Activated Yttrium Tantalate X-ray Phosphor", application Ser. No. 362,717 entitled "A Freon Free Process for Preparing a Niobium Activated Yttrium Tantalate X-Ray Phosphor", and application Ser. No. 362,720 entitled "Process For Y TaO4:Nb Phosphor Preparation Using Reduced Amount of Flux" all assigned to the same assignee as the present application.

BACKGROUND OF THE INVENTION

This invention relates to a process for preparing M' niobium activated yttrium tantalate x-ray phosphor having an M' crystal structure by a method in which a reduced amount of flux is used during milling, reducing or eliminating crucible corrosion while improving phosphor brightness. The phosphor is essentially M'YTaO$_4$ and exhibits improved luminescent properties compared to phosphors produced using greater amounts of flux. Also, reduced amount of Nb$_2$O$_5$ activator results in equivalent or improved brightness.

X-ray phosphors are used in x-ray intensifying screens which are used along with photographic film to enhance the photographic image formed on the film at the same time reducing the x-ray dose on the object during medical radiographic procedures. Phosphor materials used in these intensifying screens are to be colorless single phase with a polyhedral shape of well-defined crystal morphology. Also, the phosphors have to be good x-radiation absorbers and emit the light (energy) in the spectral region to which the photographic film is sensitive. Generally, it is required that the phosphor particle size be about 4–11 micrometers in order to form a thin layer when drawn in the form of screens using certain binder solutions as media. The phosphor material also has to have a high x-ray energy absorbing property. After absorbing the x-ray energy, when exposed, the phosphor should emit photons (light) strongly in the spectral region of the film sensitivity. The efficiency of x-ray energy-to-light conversion should be intense enough to obtain undistorted and sharp film images. There are several materials of such kind but only few have good properties necessary to make them as useful materials for intensifying screen applications.

Blasse and Bril (J. Luminescence, 3,109 (1970) describes the cathodo-and-photo luminescence properties of various rare earth tantalate phosphors. These materials have fergusonite (M-type) monoclinic crystal structure. Wolten & Chase (American Mineralogist, 52, 1536 (1967)) report that this type of tantalate (e.g., YTaO$_4$, and other rare-earth tantalates) has two polymorphs, a monoclinic (I$_2$ Space group) structure-M at low temperature and a tetragonal (Scheelite type structure with I4$_{1/a}$ space group) at high temperature. Crystal structure transition between these two forms occurs at 1325° in YTaO$_4$ and is reversible. They disclose also the formation of a new polymorph of yttrium tantalate and other rare earth tantalates. This new polymorph is obtained when the tantalates are synthesized (crystallized) below the above mentioned (1325°C.) transformation and this polymorph has a monoclinic structure with P$_{2/a}$ space group which is called M' phase. M' phase can be converted to M phase by heating above 1400° C. and then cooling to below the transition (1325° C.) temperature.

Brixner & Chen (J. Electrochemical Soc., 130 (12), 1983, 2435-43) and U.S. Pat. No. 4,225,653 describe the preparation and the crystal structure of M' phase rare earth tantalate materials and their luminescence properties. They also demonstrate that the M' phase YTaO$_4$ is an efficient host for x-ray phosphor when activated with niobium and some rare earth ions. However, it has been found that the preparation procedure is critical to obtain a single phased M'-YTaO$_4$ with increased brightness when activated with niobium. Brixner & Chen recommend the preparation of niobium activated M' rare earth tantalate phosphor by pre-firing the component oxides TaO$_5$, NbO$_5$, and Ln$_2$O$_3$ (Ln=La, Y, Ce, and Lu) at 1200° C. for 8–10 hours. The reaction products are then milled using Freon solvent as grinding fluid for about 6 hours using alumina beads as grinding medium. The resulting mixture is then either alone or with 50% by weight lithium sulfate as flux material, fired at 1250° C. for 10–14 hours. This procedure is cumbersome and the freon used in milling is expensive and environmentally hazardous.

SUMMARY OF THE INVENTION

It is an object of the present invention to provide a process for producing M'YTaO$_4$:Nb x-ray phosphor having a comparable or better luminescence emission efficiency over this type of phosphor produced by prior methods.

It is another object of the present invention to provide a process for producing M'YTaO$_4$:Nb x-ray phosphor to eliminate any milling fluid and still obtain a high quality phosphor for radiography applications.

It is another object of the present invention to provide a process for producing M'YTaO$_4$:Nb x-ray phosphor having improved anti-corrosive properties with respect to alumina crucibles.

In accordance with one aspect of the invention, there is provided a process for preparing M'YTaO$_4$:Nb x-ray phosphor which comprises forming a uniform first mixture of Y$_2$O$_3$, Ta$_2$O$_5$, and Nb$_2$O$_5$ in amounts equal to approximately the stoichiometric amounts to form the phosphor, dry-blending, forming a uniform second mixture of the first mixture and a flux of lithium chloride, the flux consisting essentially of about 25% to 33% by weight of the second mixture, firing the second mixture in a furnace by heating to a temperature of about 1200° C. to 1300° C. at a heating rate of about 1.0° C./minute to 1.5° C./minute and maintaining the temperature for about 10 to 14 hours to react the components and produce a fired material containing luminescent material, cooling the material by turning off the heat and allowing the material to remain in the furnace until the temperature is no higher than about 300° C., washing with deionized water, removing the wash water, drying, and classifying to obtain a −325 mesh particle size. The phosphor exhibits a brightness improved over that of phosphors produced by methods using organic solvents or water as the milling fluid.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a method for preparing a M' phase niobium activated yttrium tantalate x-ray phosphor in which the milling fluid is eliminated without sacrificing any appreciable brightness in the phosphor. The same quality phosphor is obtained as when organic or aqueous fluids are used.

The phosphor of the present invention is of M'YTaO$_4$:Nb structure. The M' structure of YTaO$_4$ lattice constants of the present invention are comparable to those reported in U.S. Pat. No. 4,225,653.

A uniform first mixture is formed consisting essentially of the components from which the phosphor is to be made. The components are Y$_2$O$_3$, Ta$_2$O$_5$, and Nb$_2$O$_5$. The components are provided in an amount equal to at least the stoichiometric amount required to form the phosphor. The mixture is formed by any known dry blending technique.

To the first mixture is added a flux, preferably lithium chloride. The flux makes up from about 25% to about 33% by weight of the resultant mixture and most preferably about 33% by weight.

The resultant mixture is then fired according to the following specific heating schedule to produce a fired material containing luminescent material. The reactive component-flux mixture is loaded into a furnace, typically an electic or gas-fired furnace, preferably in covered alumina containers. The furnace is then heated slowly from a starting temperature which is normally below about 300° C. up to a temperature range of from about 1200° C. to about 1300° C. at a heating rate of from about 1.0° C. per minute to about 1.5° C. per minute. This usually takes about several hours. This temperature range is maintained for from about 10 hours to about 14 hours.

The resulting fired material is then cooled according to a specific cooling schedule. The heat to the furnace is turned off and the fired material is allowed to remain in the furnace until the furnace has cooled to a temperature of no higher than about 300° C. When a temperature of about 300° C. or lower is reached, the cooled material can be taken out of the furnace.

The above described slow heating and cooling procedure ensures better reactivity of the components of the mixture with the flux being melted.

The resulting cooled material is then washed with deionized water to remove the flux. This is usually done by first soaking the cooled material in hot deionized water and then slurrying repeatedly with fresh deionized water and testing for absence of chloride when lithium chloride is used as the flux. The wash water is then removed from the washed material. Other washes can be put on the material such as isopropanol or reagent alcohol to fast dry the material, but this is not necessary.

The washed material which is M' niobium activated yttrium tantalate phosphor is dried usually at about 120° C. in an oven.

The phosphor is then classified to obtain a −325 mesh particle size.

The phosphor is M'YTaO$_4$ which exhibits a brightness or luminescence efficiency improved over the material obtained form a liquid milling process.

To more fully illustrate this invention, the following nonlimiting examples are presented.

EXAMPLE 1

About 225.81 grams of Y$_2$O$_3$, 441.89 grams of Ta$_2$O$_5$, and 5.3162 grams of Nb$_2$O$_5$ are blended in a polyethylene-lined stainless steel SWECO jar and dry-blended until uniform. Added to the blend is about 33% by weight lithium chloride as the flux material. The resultant mixture is then ball-milled. The mixture is then transferred into alumina crucibles and fired at from about 1280°–1300° C. for about 10–12 hours in an electric furnace. The resulting fired cakes are soaked in deionized water and all the chloride is leached out with subsequent deionized water washings. When the washes are free from any chloride, the product is filtered and dried at about 120° C. and then sieved through a −325 mesh screen. The phosphor prepared from this method has a formula of YTa$_{0.98}$Nb$_{0.02}$O$_4$. This sample is then measured on x-ray excited optical fluorescence spectrometer for its light output (brightness). Its brightness is improved by 13% over that of a control sample. The control sample consisted of the same components as Example 1, in the same proportions except that the flux used is lithium sulfate in an amount equal to 50% by weight. Brightness of Example 1 phosphor was improved by 7% over that of a second control sample containing lithium chloride flux, 50% by weight.

EXAMPLE 2

Same process as example 1, except that 448.65 g of Ta$_2$O$_5$ and 1.3291 g of Nb$_2$O$_5$ are ball-milled with 33% by weight LiCl flux. The phosphor prepared from this method has a formula of YTa$_{0.995}$Nb$_{0.005}$O$_4$. Phosphor brightness of Example 2 is improved by 13% over that of the first control sample and by 7% over that of the second control sample.

EXAMPLE 3

Same process as example 1, except that twenty-five percent by weight of LiCl flux is used. Phosphor brightness of Example 3 is improved by 12% over that of the first control sample and by 6% over that of the second control sample.

EXAMPLE 4

Same process as Example 1, except that 448.65 g of Ta$_2$O$_5$ and 1.3291 g of Nb$_2$O$_5$ are ball-milled with 25% by weight LiCl flux. Phosphor brightness of Example 4 is improved by 12% over that of the first control sample and by 6% over that of the second control sample.

Table 1 shows brightness data for phosphors prepared with varying concentrations of Nb$_2$O$_5$ activator and varying amounts of LiCl flux. No organic or aqueous milling fluids were used.

TABLE 1

| | BRIGHTNESS DATA ON YTaO$_4$:Nb PHOSPHOR | | | |
|---|---|---|---|---|
| Sample | Activator Concentration Moles | Flux Concentration Weight Percent | Flux | Phosphor Brightness % |
| Control 1 | 0.02 | 50 | Li$_2$SO$_4$ | 100 |
| Control 2 | 0.02 | 50 | LiCl | 106 |
| 1 | 0.02 | 33 | LiCl | 113 |
| 2 | 0.005 | 33 | LiCl | 113 |
| 3 | 0.02 | 25 | LiCl | 112 |

TABLE 1-continued

BRIGHTNESS DATA ON YTaO4:Nb PHOSPHOR

| Sample | Activator Concentration Moles | Flux Concentration Weight Percent | Flux | Phosphor Brightness % |
|---|---|---|---|---|
| 4 | 0.005 | 25 | LiCl | 112 |

The Table shows that brightness is not adversely affected by the dry milling. From these examples, it is clear that environmentally hazardous and expensive organic solvents, and even water, can be eliminated from the process. The brightness properties are improved and the corrosivity during firing of phosphors produced using this method is substantially reduced.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing M'YTaO4:Nb x-ray phosphor of enhanced brightness, said process comprising the steps of:
    (a) forming a uniform first mixture consisting essentially of $Y_2O_3$, $Ta_2O_5$, and $Nb_2O_5$ components, said components being provided in an amount equal to approximately the stoichiometric amounts required to form said phosphor;
    (b) dry milling said first mixture with a flux of lithium chloride, said flux consisting essentially of about 25% to about 33% by weight of said mixture, said weight percent of said flux being selected for optimizing the brightness of said phosphor produced in step (g);
    (c) firing said dry milled mixture in a furnace by heating said mixture in said furnace from a temperature below about 300° C. to a temperature of from about 1200° C. to about 1300° C. at a heating rate of from about 1.0° C./minute to about 1.5° C. per minute and maintaining said temperature for from about 10 hours to about 14 hours to react said components and produce a fired material containing luminescent material;
    (d) cooling the resulting fired material by turning off the heat to said furnace and allowing said fired material to remain in said furnace until the temperature in said furnace is no higher than about 300° C.;
    (e) washing the resulting cooled material with deionized water to remove essentially all of said flux therefrom and produce a washed M' niobium activated yttrium tantalate phosphor;
    (f) removing said wash water from and drying said washed phosphor; and
    (g) classifying the resulting dried phosphor to obtain a −325 mesh particle size in said phosphor.

2. A process of claim 1 wherein said component $Nb_2O_5$ is provided as an activator in an amount from about 0.005 moles of niobium to about 0.02 moles of niobium.

3. A process of claim 1 wherein said dry milled mixture of step (c) is transferred to an alumina crucible prior to firing.

* * * * *